(12) United States Patent
Kageyama (10) Patent No.: US 10,776,438 B2
(45) Date of Patent: Sep. 15, 2020

(54) INFORMATION PROVIDING SYSTEM, INFORMATION PROVIDING SERVER, INFORMATION PROVIDING METHOD, AND PROGRAM FOR INFORMATION PROVIDING SYSTEM

(71) Applicant: Takumi Kageyama, Tokyo (JP)

(72) Inventor: Takumi Kageyama, Tokyo (JP)

(*) Notice: Subject to any disclaimer, the term of this patent is extended or adjusted under 35 U.S.C. 154(b) by 252 days.

(21) Appl. No.: 15/757,079

(22) PCT Filed: Jul. 9, 2016

(86) PCT No.: PCT/JP2016/070349
§ 371 (c)(1),
(2) Date: Mar. 2, 2018

(87) PCT Pub. No.: WO2017/043172
PCT Pub. Date: Mar. 16, 2017

(65) Prior Publication Data
US 2018/0268066 A1    Sep. 20, 2018

(30) Foreign Application Priority Data
Sep. 9, 2015  (JP) ................. 2015-177449

(51) Int. Cl.
*G06F 16/9535* (2019.01)
*G06F 16/28* (2019.01)
(Continued)

(52) U.S. Cl.
CPC .... *G06F 16/9535* (2019.01); *G06F 16/24578* (2019.01); *G06F 16/285* (2019.01); *H04N 21/258* (2013.01)

(58) Field of Classification Search
CPC .............. G06F 16/9535; G06F 16/285; G06F 16/24578; H04N 21/258
(Continued)

(56) References Cited

U.S. PATENT DOCUMENTS 6,184,877 B1    2/2001  Dodson
7,181,438 B1 *  2/2007  Szabo ................. G06F 21/6245
(Continued)

FOREIGN PATENT DOCUMENTS

JP    2002-032396 A    1/2002
JP    2004-086754 A    3/2004
(Continued)

OTHER PUBLICATIONS

Supplementary European Search Report for European Patent Application No. 16844037.8 dated Mar. 29, 2019 (10 pages).
(Continued)

*Primary Examiner* — Dung K Chau
(74) *Attorney, Agent, or Firm* — Kratz, Quintos & Hanson, LLP (57) ABSTRACT

The present invention provides an information providing system, an information providing server, an information providing method, and a program for information providing system, to acquire information actually interesting to a user from sources on which the user places importance and provide the information to the user. An information providing system 1 includes an instruction acceptance unit 200 that accepts instruction information, a content-related information acquisition unit 302 that acquires content-related information, a search query generation unit 304 that generates characteristic information as search queries and associates the generated search queries with attribute information of the characteristic information, a related information acquisition unit 306 that acquires related information by using the search queries at the time when the instruction was issued, an interest area modeling unit 314 that classifies the related information into a plurality of groups and assigns weights to the groups, an interest information listing unit 316 that lists the related information in order of the weights associated (Continued)

with the plurality of groups, and a supply unit 318 that supplies listing information to the user.

16 Claims, 3 Drawing Sheets

(51) Int. Cl.
  *G06F 16/2457* (2019.01)
  *H04N 21/258* (2011.01)
(58) Field of Classification Search
  USPC .......................................................... 707/727
  See application file for complete search history.

(56) References Cited

U.S. PATENT DOCUMENTS

| | | | | |
|---|---|---|---|---|
| 2008/0195664 | A1* | 8/2008 | Maharajh | H04W 4/06 |
| 2009/0254572 | A1* | 10/2009 | Redlich | G06Q 10/06 |
| 2010/0010968 | A1* | 1/2010 | Redlich | G06Q 10/00 |
| | | | | 707/E17.014 |
| 2010/0250497 | A1* | 9/2010 | Redlich | F41H 13/00 |
| | | | | 707/661 |
| 2011/0238495 | A1* | 9/2011 | Kang | G06Q 30/02 |
| | | | | 705/14.49 |
| 2011/0258049 | A1* | 10/2011 | Ramer | G06Q 30/02 |
| | | | | 705/14.66 |
| 2014/0164507 | A1* | 6/2014 | Tesch | H04L 51/10 |
| | | | | 709/204 |

FOREIGN PATENT DOCUMENTS

| | | |
|---|---|---|
| JP | 2004-118479 A | 4/2004 |
| JP | 2013-201710 A | 10/2013 |
| WO | 00/33573 A1 | 6/2000 |

OTHER PUBLICATIONS

International Search Report for International Application No. PCT/JP2016/070349 dated Sep. 27, 2016 (1 Sheet).

* cited by examiner

INFORMATION PROVIDING SYSTEM, INFORMATION PROVIDING SERVER, INFORMATION PROVIDING METHOD, AND PROGRAM FOR INFORMATION PROVIDING SYSTEM

TECHNICAL FIELD

The present invention relates to an information providing system, an information providing server, an information providing method, and a program for information providing system. In particular, the present invention relates to an information providing system, an information providing server, an information providing method, and a program for information providing system, to provide a user who is viewing content with information interesting to the user.

BACKGROUND ART

There has been conventionally known an information providing system providing information to a user via a communication line, which includes an interest information processing unit that receives, from a user terminal, and registers interest information indicating a target on which information provision is requested by the user, a related information processing unit that accepts a request for execution of information provision from the user, a correspondence table that has registration of addresses of information sites where, for each of targets specified by the interest information, information about the target is publicly available on a communication line, and an information providing unit that searches the correspondence table based on the interest information and notifies the user of the address of the relevant information site (for example, refer to Patent Literature 1). According to the information system described in Patent Literature 1, it is possible to provide the user with information related to specific scenes of a program broadcast on television, radio, or the like, by the use of the internet.

CITATION LIST

Patent Literature

Patent Literature 1: JP 2002-032396 A

SUMMARY OF INVENTION

Technical Problem

In the information system described in Patent Literature 1, however, it is not possible to determine what fields are interesting to a user. Therefore, information actually interesting to a user may not be properly provided to the user.

In view of the above, an object of the present invention is to provide an information providing system, an information providing server, an information providing method, and a program for information providing system, to acquire information actually interesting to a user from sources on which the user places importance and provide the information to the user.

Solution to Problem

In order to solve the above issue, according to the present invention, there is provided an information providing system providing a user with information related to content, the system including: an instruction acceptance unit that accepts instruction information, from the user who is viewing content, for instructing to acquire the information at a part of the content interesting to the user, in association with the time when the instruction was issued; a content-related information acquisition unit that acquires content-related information related to details of the content in accordance with the instruction information; a search query generation unit that analyzes the content-related information, generates, as search queries, characteristic information which is characteristic of the content, and associates the generated search queries with attribute information of the characteristic information; a related information acquisition unit that accesses external sites corresponding to the attribute information to acquire related information related to the content when the instruction was issued, by using the search queries; an interest area modeling unit that classifies the related information acquired by the related information acquisition unit into a plurality of groups interesting to the user and assigns weights to the groups; an interest information listing unit that lists the related information acquired by the related information acquisition unit in order of the weights associated with the plurality of groups; and a supply unit that supplies listing information including the listed related information to the user.

The information providing system may further include a content-specific information acquisition unit that acquires content-specific information for specifying the content viewed by the user, wherein the supply unit may include at least part of the content-specific information in the listing information.

The information providing system may further include a history storage unit that stores the past listing information supplied to the user as history information, wherein the interest area modeling unit may classify the related information acquired by the related information acquisition unit into a plurality of groups and assign weights to the groups based on the history information.

In the information providing system, the history storage unit may store the history information of users different from the user.

The information providing system may further include an indexing unit that acquires the related information from pre-specified external sites and holds the acquired related information in association with external site-specific information for specifying the external sites where the related information exists, wherein in an initial state, the related information acquisition unit may acquire the related information searched for by the search queries with the related information held by the indexing unit.

The information providing system may further include a scoring unit that calculates scores of the related information acquired by the related information acquisition unit and sorts the related information in accordance with the calculated scores, wherein the interest information listing unit may list the related information in the order of the sorting.

In the information providing system, the scoring unit may perform the sorting in ascending order of the date and time when the scores were calculated.

In order to solve the above issue, according to the present invention, there is provided an information providing server providing a user with information related to content, including: a content-related information acquisition unit that, in accordance with instruction information instructed by the user, who is viewing content, for instructing to acquire the information at a part of the content interesting to the user, acquires content-related information related to details of the content; a search query generation unit that analyzes the content-related information, generates, as search queries, characteristic information which is characteristic of the content, and associates the generated search queries with attribute information of the characteristic information; a related information acquisition unit that accesses external sites corresponding to the attribute information to acquire related information related to the content when the instruction was issued, by using the search queries; an interest area modeling unit that classifies the related information acquired by the related information acquisition unit into a plurality of groups interesting to the user and assigns weights to the groups; an interest information listing unit that lists the related information acquired by the related information acquisition unit in order of the weights associated with the plurality of groups; and a supply unit that supplies listing information including the listed related information to the user.

In order to solve the above issue, according to the present invention, there is provided an information providing method in an information providing system providing a user with information related to content, including: an instruction acceptance step of accepting instruction information, from the user who is viewing content, for instructing to acquire information at a part of the content interesting to the user, in association with the time when the instruction was issued; a content-related information acquisition step of acquiring content-related information related to details of the content in accordance with the instruction information; a search query generation step of analyzing the content-related information, generating, as search queries, characteristic information which is characteristic of the content, and associating the generated search queries with attribute information of the characteristic information; a related information acquisition step of accessing external sites corresponding to the attribute information to acquire related information related to the content when the instruction was issued, by using the search queries; an interest area modeling step of classifying the related information acquired in the related information acquisition step into a plurality of groups interesting to the user and assigning weights to the groups; an interest information listing step of listing the related information acquired in the related information acquisition step in order of the weights associated with the plurality of groups; and a supply step of supplying listing information including the listed related information to the user.

In order to solve the above issue, according to the present invention, there is provided a program for an information providing system providing a user with information related to content, the program causing the information providing system to implement: an instruction acceptance function of accepting instruction information, from the user who is viewing content, for instructing to acquire the information at a part of the content interesting to the user, in association with the time when the instruction was issued; a content-related information acquisition function of acquiring content-related information related to details of the content in accordance with the instruction information; a search query generation function of analyzing the content-related information, generating, as search queries, characteristic information which is characteristic of the content, and associating the generated search queries with attribute information of the characteristic information; a related information acquisition function of accessing external sites corresponding to the attribute information to acquire related information related to the content when the instruction was issued, by using the search queries; an interest area modeling function of classifying the related information acquired by the related information acquisition function into a plurality of groups interesting to the user and assigning weights to the groups; an interest information listing function of listing the related information acquired by the related information acquisition function in order of the weights associated with the plurality of groups; and a supply function of supplying listing information including the listed related information to the user.

Advantageous Effects of Invention

According to the information providing system, the information providing server, the information providing method, and the program for information providing system of the present invention, it is possible to provide an information providing system, an information providing server, an information providing method, and a program for information providing system, to acquire information actually interesting to a user from sources on which the user places importance.

DESCRIPTION OF EMBODIMENTS

[Embodiment]

Figure 1:
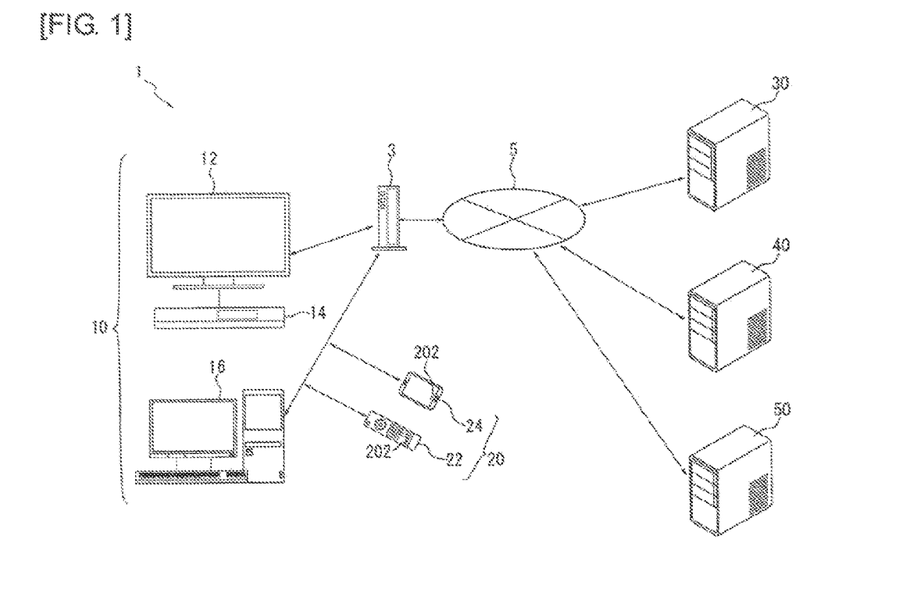
FIG. 1 illustrates a schematic view of an information providing system according to an embodiment.

FIG. 1 illustrates a schematic view of an information providing system according to an embodiment of the present invention.

(Overview of an Information Providing System 1)

When a user who is viewing content broadcast on television and/or content broadcast on a network such as the internet encounters a part of the content interesting to the user, the information providing system 1 according to the embodiment accepts an instruction from the user. In accordance with the instruction, the information providing system 1 acquires information about the content corresponding to the user's preferences, hobbies, and interests from external sites. Subsequently, the information providing system 1 provides the user with information assumed to be interesting to the user, out of the acquired information, on a priority basis.

The content includes, for example, television programs, advertisements run in television programs, recorded television programs, recorded advertisements, and/or programs and advertisements distributed on communication networks such as the internet. The information about the content provided to the user is, for example, information posted in some sites existing outside the information providing system 1 at the point in time when the user issues the instruction, and information about the content that is talked about at that time in external sites (for example, social networking service sites and the like). In the case of a recorded television program or the like, the information about the content provided to the user may be information at the point in time when the television program or the like was actually broadcast.

The information providing system 1 includes an information providing unit 10 (for example, a television 12, a video recorder 14, and/or a personal computer 16) that provides content and predetermined information to the user, an instruction input unit 20 (for example, a remote controller 22 of the television 12 and a mobile information terminal 24 such as a smartphone) that accepts an instruction from the user, and an information providing server 30 that acquires information to be provided to the user in accordance with the instruction from the user and supplies the information providing unit 10 and/or the instruction input unit 20 with the information to be provided to the user. The information providing server 30 acquires the information to be provided to the user from an external server 40. In the embodiment, there exist one or more external servers 40. The information providing system 1 can also insert predetermined advertisements supplied from an advertisement server 50 of an advertising agency into the information to be provided to the user. The information providing system 1 may be configured as a pad-type mobile terminal.

For instance, an example of a user who is viewing a television program will be described. First, a button 202 for accepting an instruction from the user is provided in the remote controller 22 of the television 12 and the video recorder 14 for recording television programs, the personal computer 16 with a television tuner incorporated therein, and/or the mobile information terminal 24. In the case of using the mobile information terminal 24, an application for the mobile information terminal 24 is used to display the button 202 on the display screen of the mobile information terminal 24. The television 12, the video recorder 14, and/or the personal computer 16 are connected in a wired or wireless manner to a communication network 5 such as the internet. The television 12, the video recorder 14, and/or the personal computer 16 can be connected to the communication network 5 via a router 3 such as a wired router or a wireless router. A SIM card-equipped terminal may be used instead of the router 3.

For example, the user who is viewing content, such as a television program broadcast on the television 12, takes interest in a part of the content. In that case, the user clicks the button 202 to issue an instruction to provide information to the information providing system 1. The information providing system 1 accepts the instruction from the user in association with the year, month, date, and time when the content is broadcast.

Upon receipt of the instruction from the user, the information providing server 30 generates a search query based on the information about the details of the content. The information providing server 30 then uses the search query to acquire the information related to the content from the external servers 40. The information about the details of the content includes, for example, information on the broadcast television program (for example, the program title, the cast members, and the like), information in television program listing publicly available on the internet, caption data added by the broadcaster at the time of broadcast, and/or keywords added by the broadcaster at the time of broadcast of the program. The information in television program listing publicly available on the internet or the like is useful for correcting the search query when no program information is added to the broadcast images or recorded images or when there are regional differences in the day and time zone of broadcast. The information providing server 30 uses the search query generated based on these keywords to acquire, from the external servers 40, the information at the point in time when the user's instruction is accepted (that is, the year, month, date, and time when the user's instruction is accepted) as the information about the content. The external servers 40 include, for example, servers of electronic bulletin boards, dictionary/glossary sites, talent agencies' sites, social networking service sites, news sites providing various genres of news, blog sites, or product and service providing companies' sites on the network.

The information providing server 30 classifies the acquired information into a plurality of groups assumed to be interesting to the user. The information providing server 30 assigns weights to the plurality of groups in accordance with the user's degrees of interest based on the user's operation history or the like. The information providing server 30 then selects some of the groups in decreasing order of weight, and lists the information such that the information in the selected groups is placed high on the list. The information providing server 30 supplies the listed information to the information providing unit 10 and/or the instruction input unit 20. The information providing server 30 can include advertisement information supplied from the advertisement server 50 into the listed information in accordance with the user's degrees of interest.

The information providing system 1 can register, in advance, the destinations of the information supplied from the information providing server 30. The destinations of the information are, for example, electronic mail addresses, addresses of message exchange software, and the like. The information providing system 1 can also supply the information to the information providing unit 10 and/or the instruction input unit 20 at predetermined timing. The timing may be, for example, immediately after the acquisition of the information from the external server 40 or at a predetermined frequency such as once a day.

In this manner, the information providing system 1 according to the embodiment can provide automatically the information matching the user's tastes to the information providing unit 10 and/or the instruction input unit 20 by the user's simple clicking on the button 202. This makes it possible to save the user from having to search the network for interesting information while viewing the content.

(Details of the Information Providing System 1)

Figure 2:
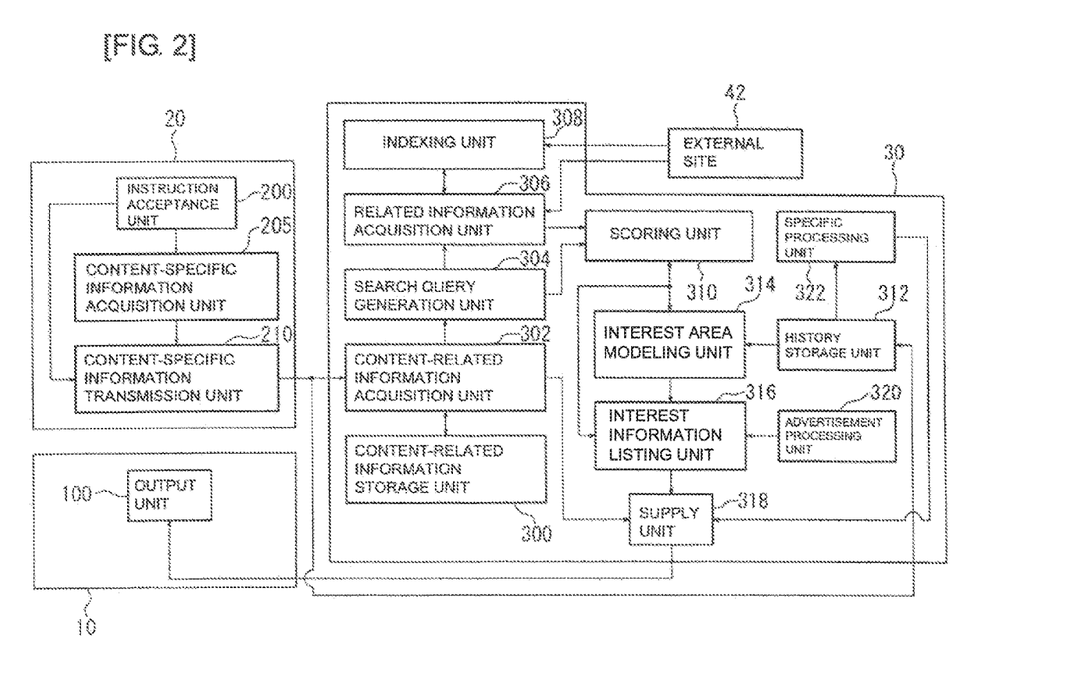
FIG. 2 is a block diagram of a functional configuration of the information providing system according to the embodiment.

FIG. 2 illustrates an example of functional configuration blocks of the information providing system according to the embodiment.

The information providing system 1 providing information about content to the user includes the information providing unit 10, the instruction input unit 20, and the information providing server 30. The information providing unit 10 is a device that outputs content such as television programs and internet programs, that includes, for example, the television 12, the video recorder 14 having a television program recording function, an information terminal such as the personal computer 16 with a television tuner internally or externally added, a mobile telephone, and the like. The instruction input unit 20 is a device that accepts an instruction from the user, for example, such as the remote controller 22 of the television 12 and the video recorder 14, and the mobile information terminal 24 such as a smartphone. Some or all of components and/or functions of the instruction input unit 20 may be incorporated in the information providing unit 10.

(The Information Providing Unit 10)

The information providing unit 10 is connected to the communication network 5, such as a broadcast network or the internet, in an interactively communicable manner. The information providing unit 10 is capable of receiving content. The information providing unit 10 has an output unit 100 that outputs the content and the information received from the information providing server 30 to the user in a perceivable manner. The output unit 100 is, for example, a display unit that displays images and/or a sound output unit that outputs sounds.

(The Instruction Input Unit 20)

The instruction input unit 20 has an instruction acceptance unit 200 that accepts the user's instructions, a content-specific information acquisition unit 205 that acquires content-specific information for specifying content, and a content-specific information transmission unit 210 that transmits the content-specific information to the information providing server 30. The instruction acceptance unit 200 is, for example, the button 202 provided in the remote controller 22 or the like. The instruction acceptance unit 200 can also accept instructions by sound, gesture, or vibration. In this case, the instruction acceptance unit 200 can include a sound acquisition unit that acquires sounds, a sound instruction determination unit that determines the acquired sound instruction, an image acquisition unit that acquires an image, a gesture determination unit that determines a gesture instruction from the acquired image, and/or a vibration detection and determination unit that detects vibration and determines whether a pattern of the detected vibration matches a pattern associated with a predetermined instruction. When some or all of components and/or functions of the instruction input unit 20 are incorporated in the information providing unit 10, the information providing unit 10 may include, for example, all the components and functions except for the instruction acceptance unit 200.

(The Instruction Acceptance Unit 200)

The instruction acceptance unit 200 accepts instruction information, from the user who is viewing content, for instructing to acquire information at a part of the content interesting to the user. The instruction acceptance unit 200 accepts the instruction information in association with the time of issuance of the instruction, that is, the year, month, date, and time. Specifically, the instruction acceptance unit 200 accepts the instruction information in association with user identification information for uniquely identifying the user or unique address information specified by the user, date and time information indicating the date and time when the user took interest in the content and issued the instruction, and/or selection information indicating the selection made by the user from output information output to the instruction input unit 20 and/or the information providing unit 10. The instruction acceptance unit 200 supplies the accepted information to the content-specific information acquisition unit 205. The instruction acceptance unit 200 also supplies operation information indicating various user operations accepted from the user to the content-specific information acquisition unit 205.

The user identification information includes, for example, the user name, the user ID, the mail address, the unique address of message exchange software, and/or the telephone number. The address information includes the mail address specified by the user and the like. The date and time information include year, month, date, hour, minute, and second. The output information includes the information supplied from the information providing server 30 and output to the instruction input unit 20 and/or the information providing unit 10 in accordance with the user's instruction, that is, the information interesting to the user or likely to be interesting to the user (interest information).

The output information is information about content, for example, that includes information acquired from external sites provided by the external server 40 that store information on content title and various objects included in the content (characters, characters' clothing and accessories, shooting locations, buildings, and the like) and/or external site-specific information for specifying the external sites (for example, URLs). Further, the selection information includes information, out of the output information, that is actually selected by the user from external sites to check the information, attribute information of the external sites that have the output information and/or the information actually selected by the user (for example, the information indicating the genres of the external sites), information indicating keywords obtained by subjecting text data included in the output information to morphological analysis, information indicating a search query used in searching for the output information, and the like.

Upon acceptance of an instruction to view the selection information, the instruction acceptance unit 200 supplies to the content-specific information acquisition unit 205 the information indicating the date and time when the viewing instruction was accepted, the number of times the instruction was accepted, and/or the period of time during which the user viewed the selection information (hereinafter, referred to as "viewing and staying time"), and the like. Hereinafter, the output information, the selection information, the operation information, and/or the information indicating the viewing and staying time will be referred to as "various kinds of information" The instruction acceptance unit 200 may accept the viewing instruction via the content output to the output unit 100. In this case, the information providing server 30 can store the information indicating the viewing instruction and the like.

(The Content-Specific Information Acquisition Unit 205)

The content-specific information acquisition unit 205 acquires the content-specific information for specifying the content or a specific scene of the content viewed by the user, in accordance with the instruction information. The content-specific information acquisition unit 205 acquires the content-specific information in association with the date, hour, minute, and second when the instruction acceptance unit 200 accepted the instruction information and/or a period of time elapsed since the starting of the content. The content-specific information acquisition unit 205 supplies the acquired content-specific information to the content-specific information transmission unit 210.

The content-specific information is information for specifying the content, which indicates, for example, the channel on which the content is provided, the date and time of broadcast, the program title, the images and sounds, a period of time elapsed since the starting of the content. The content-specific information may include a content-specific information identifier for uniquely identifying the content and/or a plurality of scenes included in the content. The content-specific information acquisition unit 205 acquires the channel, the date and time of broadcast, the program title, and the like from the data provided by the broadcast station, and/or the television program listing or the like publicly available on the internet or the like. The content-specific information acquisition unit 205 automatically acquires the images and/or sounds of the content as part of the content-specific information while the user issues an instruction to the instruction acceptance unit 200 or during a predetermined period of time from the instant when the instruction acceptance unit 200 accepted the instruction information.

(The Content-Specific Information Transmission Unit 210)

The content-specific information transmission unit 210 transmits, to the information providing server 30, the content-specific information received from the content-specific information acquisition unit 205 and the various kinds of information received from the instruction acceptance unit 200. The content-specific information transmission unit 210 transmits, to the information providing server 30, the content-specific information and the various kinds of information in association with the date, hour, minute, and second when the instruction acceptance unit 200 accepted the instruction information. When the content-specific information transmission unit 210 transmits the content-specific information and the various kinds of information to the information providing server 30 via the router 3, the router 3 can assign IP addresses to the content-specific information and the various kinds of information. If the instruction input unit 20 has a location information acquisition unit (for example, if the instruction input unit 20 is a smartphone or the like, the smartphone or the like contains a GPS as location information acquisition unit), the content-specific information transmission unit 210 may transmit, to the information providing server 30, location information indicating the location of the instruction input unit 20 acquired by the location information acquisition unit, together with the content-specific information and the various kinds of information. For example, when there are regional differences in day and time zone of broadcast, the information providing server 30 can use the location information to correct the data with the differences in day and time zone of broadcast.

(The Information Providing Server 30)

The information providing server 30 has a content-related information storage unit 300 that stores content-related information related to the details of the content, a content-related information acquisition unit 302 that acquires the content-related information, a search query generation unit 304 that generates a search query, a related information acquisition unit 306 that acquires related information related to the content, an indexing unit 308 that holds the acquired related information in association with the external site-specific information for specifying external sites 42 where the related information exists, and a scoring unit 310 that calculates scores of the related information.

The information providing server 30 further has a history storage unit 312 that stores a history of user operations and the like, an interest area modeling unit 314 that classifies the related information into a plurality of groups interesting to the user and assigns weights to the groups, an interest information listing unit 316 that lists the interest information, a supply unit 318 that supplies listing information including the listed interest information to the information providing unit 10, an advertisement processing unit 320 that includes advertisement information in the listing information, and a specific processing unit 322 that executes specific processing such as calculation of viewing rates of the content.

(The Content-Related Information Storage Unit 300)

The content-related information storage unit 300 stores the content-related information in association with the content-specific information. The content-related information includes the date and time when the content was provided, the program title of the content, the cast members of the content, the synopsis of the content, and/or the caption data associated with the content. The content-related information storage unit 300 may be included in a separately provided server outside the information providing server 30. The content-related information storage unit 300 supplies the content-related information to the content-related information acquisition unit 302 in response to the action of the content-related information acquisition unit 302.

(The Content-Related Information Acquisition Unit 302)

The content-related information acquisition unit 302 acquires the content-related information related to the details of the content in accordance with the instruction information. That is, the content-related information acquisition unit 302 acquires the content-related information of the content specified by the content-specific information received from the content-specific information transmission unit 210. Specifically, the content-related information acquisition unit 302 acquires the content-related information stored in the content-related information storage unit 300 in association with the content-specific information. The content-related information acquisition unit 302 supplies the acquired content-related information and/or the content-specific information to the search query generation unit 304 and/or the supply unit 318.

(The Search Query Generation Unit 304)

The search query generation unit 304 analyzes the content-related information received from the content-related information acquisition unit 302. Then, the search query generation unit 304 generates, as search queries, characteristic information which is characteristic of the content specified by the content-specific information or characteristic information which is characteristic of some scenes of the content. The search query generation unit 304 may also associate the generated search queries with the priority ranking and/or attribute information of the characteristic information. Therefore, in the embodiment, the search queries are characteristic information that includes morphemes, phrases, or complex words of them. The search query generation unit 304 supplies the generated search queries to the related information acquisition unit 306.

Specifically, the search query generation unit 304 analyzes the content-related information by morphological analysis or the like to extract morphemes. The search query generation unit 304 then generates ones of the extracted morphemes corresponding to the characteristic information, as search queries to be used for searching the external sites 42. The characteristic information is unique information characterizing the content, which includes, for example, the date and time when the content was provided, the program title of the content, the cast members of the content, the words appearing in the synopsis of the content, the caption data included in the content, the names of clothing and accessories appearing in the content, the brand names of the clothing and accessories, the names of various products such as foods and drinks appearing in the content, and/or the words indicating the locations, the buildings, and the like appearing in the content.

The search query generation unit 304 also associates the generated search queries with the priority ranking according to the attributes of the characteristic information. The attributes of the characteristic information are the natures of the characteristic information. For example, when the characteristic information is information indicating the program title, the characteristic information has the attribute "program title". When the characteristic information is information indicating a person's name, the characteristic information has the attribute "person's name". Therefore, the characteristic information may have various attributes such as music name, artist's name, location name, product name, building name, or the like. The search query generation unit 304 assigns the degrees of priority to the attributes of the characteristic information, for example, by assigning the highest degree of priority to the attribute "program name" and the second highest degree of priority to the attribute "person's name"

When the content-specific information includes the information that the content is recorded content, the search query generation unit 304 may generate a search query in association with the date and time when the content was actually broadcast.

(The Related Information Acquisition Unit 306)

The related information acquisition unit 306 uses the search queries generated by the search query generation unit 304 to search the external sites 42 and acquire the related information. Specifically, the related information acquisition unit 306 accesses the external sites 42 corresponding to the attribute information of the characteristic information, and uses the search queries to acquire the related information at the time of issuance of the instruction by the user. The related information acquisition unit 306 also supplies the search queries to the indexing unit 308. Specifically, the related information acquisition unit 306 searches the external sites 42 corresponding to the attribute information associated with the search queries to acquire the related information by the use of the search queries. In an initial state, the related information acquisition unit 306 may receive the related information acquired by the indexing unit 308 from the indexing unit 308. The related information acquisition unit 306 supplies the acquired related information to the scoring unit 310.

More specifically, the related information acquisition unit 306 includes a database that stores information on correspondences between the attribute information associated with the search queries and the attribute information in the external sites 42, and acquires the related information based on the database. For example, when the attribute information associated with a search query is "person's name", the related information acquisition unit 306 searches the external sites 42 associated with the attribute information "talent agency" or "dictionary" to acquire the related information. When the attribute information associated with a search query is "program name", the related information acquisition unit 306 searches the external sites 42 associated with the attribute information "bulletin board" or "microblog" to acquire the related information. In this manner, the database stores the attribute information of the search queries and the attribute information of the external sites 42 in association with each other. The database can be updated as necessary.

The external sites 42 are sites where various kinds of information is posted, such as news site, social networking sites, information sites such as dictionaries, electronic bulletin board sites, blog sites, and television program listing publicly available on the internet. The related information is information obtained by searching the external sites 42 with search queries, such as detailed information on the content program, detailed information including the profiles of characters and cast members of the program, information about shops appearing in the program, detailed information about products and services appearing in the program.

In the case where the content-specific information includes information indicating that the content is recorded content, if the search query generation unit 304 generates search queries in association with the date and time when the content was actually broadcast, the related information acquisition unit 306 can search for and acquire the related information of the date and time.

(The Indexing Unit 308)

The indexing unit 308 acquires the related information related to the content from the pre-specified external sites 42, and holds the acquired related information in association with the external site-specific information for specifying the external sites 42 where the related information exists. The external site-specific information is, for example, information indicating the locations of resources provided by internet applications or the like, such as URLs as an example. The indexing unit 308 may hold the external site-specific information in association with the degrees of importance of the external sites 42. The indexing unit 308 may be included in the external sites 42.

The indexing unit 308 acquires the related information by using the content-specific information of the content scheduled for broadcast. That is, the indexing unit 308 can acquire the related information in the initial state of the information providing system 1. The indexing unit 308 holds the related information in association with the attribute information of the related information, the attribute information of the external sites, and/or updating date and time information of the related information at the external sites. The indexing unit 308 updates the held information as necessary.

Specifically, the indexing unit 308 searches the external sites 42 by using search queries, and acquires and holds the related information. The indexing unit 308 selects the external sites 42 corresponding to the attribute information associated with the search queries, from among the external sites 42 specified by the external site-specific information. The indexing unit 308 then searches the external sites 42 selected by using the search queries to acquire and hold the related information. The indexing unit 308 supplies the acquired related information to the related information acquisition unit 306 in response to the action of the related information acquisition unit 306. That is, the related information acquisition unit 306 may acquire the related information hit with the search queries from the related information held by the indexing unit 308 in the initial state. The related information acquisition unit 306 supplies the related information received from the indexing unit 308 to the scoring unit 310. The related information acquisition unit 306 may have some or all of the functions of the indexing unit 308.

(The Scoring Unit 310)

The scoring unit 310 calculates the scores of the related information acquired by the related information acquisition unit 306, and sorts the related information in accordance with the calculated scores. Specifically, the scoring unit 310 calculates the scores of the acquired related information based on the degrees of similarity between the search queries and the related information, associates the calculated scores with the related information, and sorts the related information in accordance with the calculated scores. The scoring unit 310 sorts the related information such that the related information with higher scores is placed on higher ranks. Alternatively, the scoring unit 310 may compare the updating date and time information of the related information to the current time, and sort the related information such that the related information with the updating date and time information closer to the current time is placed on higher ranks. This allows newer pieces of the same information to be sorted and placed on higher ranks.

More specifically, the scoring unit 310 associates the words (morphemes) of text data included in the related information with scores by a method such as TF-IDF. For example, the scoring unit 310 calculates the frequencies of appearance of morphemes in the text data of the related information. The scoring unit 310 also calculates the logarithm of the value obtained by dividing the total number of text data included in the related information by the total number of text data including predetermined morphemes.

The scoring unit 310 then calculates the products of the calculated appearance frequencies and the calculated logarithms as scores. Subsequently, the scoring unit 310 associates the calculated scores with the related information.

In addition, the scoring unit 310 may assign weights, in advance, to the external sites 42 and associate higher scores with the related information at the external sites 42 with heavier weights, that is, the related information in the external sites 42 with higher degrees of importance. Further, if the content is recorded content, the scoring unit 310 may associate scores with the related information in accordance with the actual time zone of broadcast of the content that would be found by analyzing the content-specific information. The scoring unit 310 may sort the related information associated with scores in the ascending order of the date and time when the scores were calculated. The scoring unit 310 supplies the related information associated with the scores to the interest area modeling unit 314 and/or the interest information listing unit 316. The related information acquisition unit 306 may have some or all of the functions of the scoring unit 310.

(The History Storage Unit 312)

The history storage unit 312 stores the past listing information supplied to the user as history information. Specifically, the history storage unit 312 stores various kinds of information such as output information output in the past to the instruction input unit 20 and/or the information providing unit 10, selection information selected by the user through the instruction acceptance unit 200 from the output information output to the output unit 100, external site-specific information as sources of the output information, external site-specific information as sources of the selection information, and operation information indicating user operations accepted by the instruction acceptance unit 200, as history information.

For example, the history storage unit 312 stores the following information as history information. That is, the history storage unit 312 stores: information for specifying, out of the output information output to the output unit 100 in accordance with the user's instruction, the information actually viewed by the user and the information not viewed by the user (hereinafter, referred to as "first information"); various kinds of information on external sites where there exist the information, out of the output information, actually viewed by the user and the information not viewed by the user (for example, the external site-specific information, the external site attribute information, and the like) (hereinafter, referred to as "second information"); information on characteristic words at the external sites where there exist the information, out of the output information, actually viewed by the user and the information not viewed by the user (hereinafter, referred to as "third information"); search queries used to acquire, out of the output information, the information actually viewed by the user and the information not viewed by the user and information indicating the date and time when the user actually viewed the information, out of the output information, actually viewed by the user and the number of times the user actually viewed the information (hereinafter, referred to as "fourth information"), staying time during which the user stayed the external site where the information, out of the output information, actually viewed by the user is posted (that is, the viewing and staying time) (hereinafter, referred to as "fifth information"), and the like.

In addition, the history storage unit 312 can store the history information of users other than the user operating the instruction input unit 20. For example, the history storage unit 312 can store the history information of other users similar in preference and interest to the user operating the instruction input unit 20. Further, the history storage unit 312 may store an action history of the user on the network (for example, query logs for web search, purchase histories at commercial sites, and the like). The history storage unit 312 supplies the stored history information to the interest area modeling unit 314 in response to the action of the interest area modeling unit 314.

(The Interest Area Modeling Unit 314)

The interest area modeling unit 314 classifies the related information acquired by the related information acquisition unit 306 into a plurality of groups interesting to the user and assigns weights to the groups. Specifically, the interest area modeling unit 314 classifies the related information into a plurality of groups (that is, a plurality of clusters) interesting to the user, based on the history information stored in the history storage unit 312. The interest area modeling unit 314 may also assign weights to the external sites as sources of the related information belonging to the plurality of groups. For example, the interest area modeling unit 314 assigns weights to the user interest areas by a plurality of predetermined genres and classifies the same into a plurality of groups.

Specifically, the interest area modeling unit 314 performs the classification into a plurality of groups and the assignment of weights, based on the output information, the selection information, the external site-specific information, and/or the operation information stored in the history storage unit 312. For example, the interest area modeling unit 314 performs a hashing process and/or a multi-dimensional vectoring process on the search queries and the first information to the fifth information. Accordingly, the interest area modeling unit 314 implements the classification into a plurality of groups and the assignment of weights (that is, modeling). The interest area modeling unit 314 may utilize a clustering method for generation of classified models. The clustering method is preferably, for example, a non-hierarchical clustering method such as k-means. In addition, when the history information stored in the history storage unit 312 is updated, the interest area modeling unit 314 performs again the classification and weighting processes.

When the information providing server 30 acquires IP addresses and location information from the instruction input unit 20, the interest area modeling unit 314 may filter the interest information by using the IP addresses and/or the location information. Accordingly, even if broadcast of programs such as television programs is different among regions, the interest area modeling unit 314 can perform properly the classification and weighing processes.

The interest area modeling unit 314 also analyzes the history information to determine the attributes of the external sites 42 on which the user places importance. The interest area modeling unit 314 then assigns weights to the external sites 42 in accordance with the degrees of importance placed by the user (for example, the interest area modeling unit 314 measures the number of times the user visited the external sites 42 and determines that larger degrees of importance are placed on the external sites with larger numbers of visits). Accordingly, the interest area modeling unit 314 can perform modeling for each of groups to indicate whether the user tends to place importance on the external sites 42 of social networking, such as microblogs and electronic bulletin boards, or on the information sites such as news sites and information program sites.

The plurality of groups refers to the genres of content, for example, the genres of programs such as "drama", "movie", "music", "variety show", "animation/special-effect film", "hobby/education", "news/press report", "sports", "information/tabloid show", "documentary/cultural accomplishments", "theatrical entertainment/performance", and/or "welfare".

(The Interest Information Listing Unit 316)

The interest information listing unit 316 lists the related information acquired by the related information acquisition unit 306 in decreasing order of the weights associated with the plurality of groups by the interest area modeling unit 314. That is, in accordance with the weights associated with the plurality of groups, the interest information listing unit 316 lists the related information belonging to the groups more interesting to the user on a priority basis. The interest information listing unit 316 generates listing information including the listed related information. The interest information listing unit 316 supplies the generated listing information to the supply unit 318.

For example, the interest area modeling unit 314 classifies the user's interests into the groups"drama", "news/press report", and "variety show", assigns weights to the groups in this order, and makes a model of the tendency to place greater importance on the external sites 42 of social networking than the external sites 42 of information sites. In this case, the interest information listing unit 316 classifies the interest information into the groups"drama", "news/press report", and"variety show", and lists the interest information in this order. Further, the interest information listing unit 316 places the interest information acquired from the social networking sites higher on the list than the interest information acquired from the information sites, in each of the groups. Accordingly, the interest information listing unit 316 can list the information more interesting to the user on a priority basis.

In an initial state, the interest information listing unit 316 can also refer to the information received from the scoring unit 310 and list the related information. That is, when the user using the information providing system 1 for the first-time requests interest information from the information providing system 1, the information providing system 1 has not yet learned the user's preferences and interests. In this case, the interest information listing unit 316 refers to the scores automatically associated with the related information by the scoring unit 310 using the related information acquired in advance by the indexing unit 308 and the search queries generated by the search query generation unit 304, and lists the related information in decreasing order of score.

(The Supply Unit 318)

The supply unit 318 supplies the listing information including the listed related information to the user. That is, the supply unit 318 supplies the listing information to the instruction input unit 20 and/or the information providing unit 10. The supply unit 318 may also include at least part of the content-specific information in the listing information. That is, the supply unit 318 may include at least part of the content-specific information received from the content-related information acquisition unit 302, for example, the images and/or sounds of the content that is automatically acquired while the user provides an instruction to the instruction acceptance unit 200 or during a predetermined period of time from the instant when the instruction acceptance unit 200 accepted the instruction information. Upon receipt of the listing information from the supply unit 318, the output unit 100 outputs the listing information to the user in a perceivable manner.

(The Advertisement Processing Unit 320)

The advertisement processing unit 320 inserts advertisements in the related information listed by the interest information listing unit 316. That is, the advertisement processing unit 320 accepts bids from advertisers and selects advertisements corresponding to the listed related information. Then, the advertisement processing unit 320 inserts the selected advertisements in the listing information.

(The Specific Processing Unit 322)

The specific processing unit 322 estimates the content assumed to be interesting to the user based on the history information stored in the history storage unit 312, and generates recommendation information for recommending the viewing and/or recording of the estimated content. The specific processing unit 322 supplies the generated recommendation information to the supply unit 318. The supply unit 318 can include the recommendation information into the listing information. The specific processing unit 322 can also include automatic recording instruction information in the generated recommendation information. In this case, upon receipt of the listing information including the automatic recording instruction information, the information providing unit automatically records the content specified by the automatic recording instruction information, in accordance with the automatic recording instruction information. In addition, the specific processing unit 322 can include an instruction to record all the programs into the automatic recording instruction information, and generate must-see recommendation information for recommending the programs including details assumed to be interesting to the user in the recorded images as "must-see" programs, based on the history information stored in the history storage unit 312.

The specific processing unit 322 can calculate the viewing rates of the content based on the history information. For example, the specific processing unit 322 can calculate the amounts of interest by object for a specific period of time crossing over a plurality of programs and content.

(Details of the Listing Information)

Figure 3:
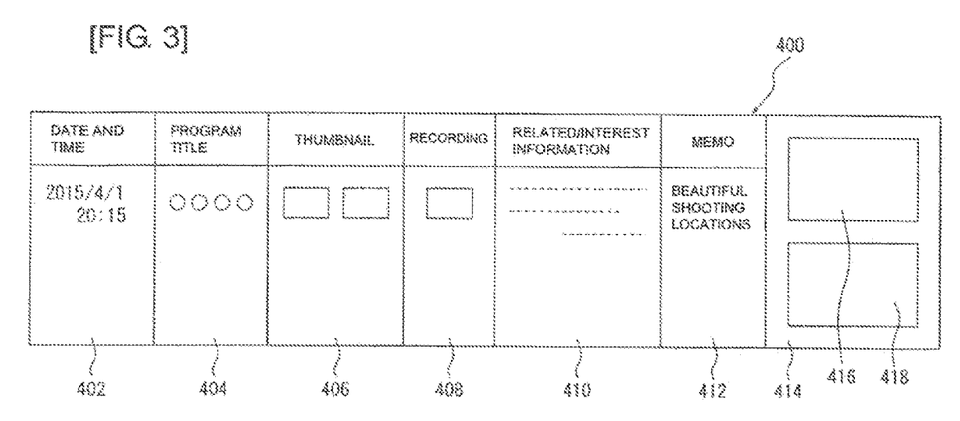
FIG. 3 illustrates a schematic view of listing information according to the embodiment.

FIG. 3 illustrates an example of an overview of listing information according to the embodiment.

Listing information 400 includes the related information listed by the interest information listing unit 316. Specifically, the listing information 400 includes the date and time information including the year, month, date, hour, minute, second and/or day of week when the user's instruction information was accepted, the program title information including the title of the content targeted by the user's instruction information, and the interest information acquired by the related information acquisition unit 306 and listed by the interest information listing unit 316. The listing information 400 may also include the images and/or sounds of the content automatically acquired by the content-specific information acquisition unit 205 while the user provides an instruction to the instruction acceptance unit 200 or for a predetermined period of time from the instant when the instruction acceptance unit 200 accepted the instruction information, as thumbnail images and/or moving images. The listing information 400 can include the information related to the content input by the user via the instruction input unit as memo information. Further, the listing information 400 can include the advertisements selected by the advertisement processing unit 320 as advertisement information.

For example, as illustrated in FIG. 3, in the listing information 400, the date and time information (for example, the information indicating the year, month, date, hour, minute, and second when the user's instruction information was accepted) is inserted into a date and time field 402, the program title information (for example, the information indicating the television program title or the like)

into a program title field 404, the thumbnail images are inserted into a thumbnail field 406, the moving images are inserted into a recording field 408, the interest information (for example, the information about persons appearing in the content viewed by the user) into a related/interest information field 410. In addition, in the listing information 400, the memo information (for example, the information indicating a user's memorandum and accepted by the instruction input unit 20) is inserted into a memo field 412, and an advertisement 416 and an advertisement 418 are inserted into an advertisement field 414. The interest information listing unit 316 can display the interest information in decreasing order of the scores associated with the interest information, in the related/interest information field 410.

The supply unit 318 supplies the listing information 400 as described above to the information providing unit 10. For example, if the information providing unit 10 has a display screen of a television or the like, the information providing unit 10 displays the received listing information 400 on the display screen. If the instruction input unit 20 is an information terminal such as a smartphone or a cell phone, the supply unit 318 can supply the listing information 400 to the information terminal. In the case of supplying the listing information 400 to the information terminal, the supply unit 318 can supply the listing information 400 to the information terminal immediately upon generation of the listing information 400.

(Process Flow in the Information Providing System)

Figure 4:
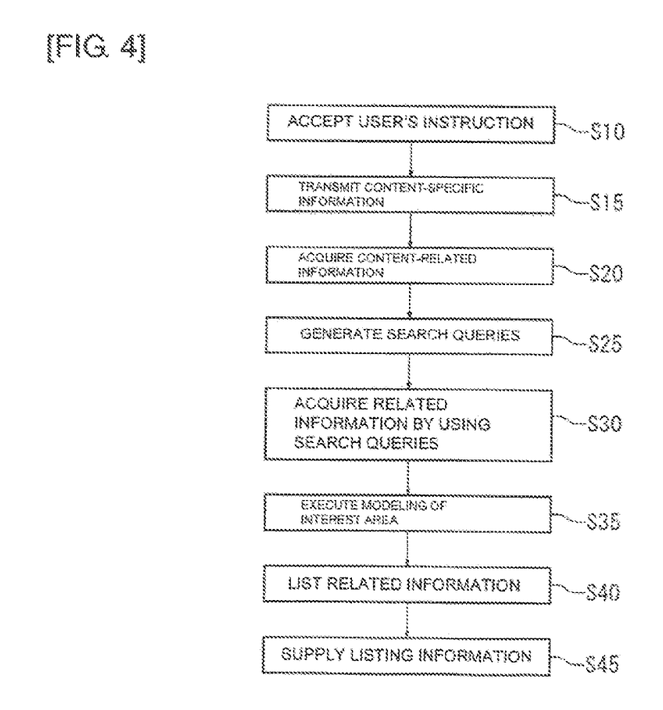
FIG. 4 is a flowchart of processing in the information providing system according to the embodiment.

FIG. 4 illustrates an example of flow of processing in the information providing system according to the embodiment.

First, the instruction acceptance unit 200 accepts an instruction from the user (step 10, the term step will be hereinafter referred to as "S"). That is, when the user who is viewing content takes interest in the content, the instruction acceptance unit 200 accepts the instruction information, from the user, for instructing to acquire the related information through the instruction input unit 20. The instruction acceptance unit 200 supplies the instruction information to the content-specific information acquisition unit 205. In accordance with the instruction information, the content-specific information acquisition unit 205 acquires the content-specific information of the content viewed by the user from the program listing data or the like provided by the broadcast station. The content-specific information acquisition unit 205 acquires the content-specific information in association with the date, hour, minute, and second when the instruction information was accepted. The content-specific information acquisition unit 205 supplies the content-specific information to the content-specific information transmission unit 210. The content-specific information transmission unit 210 transmits, to the information providing server 30, the content-specific information in association with the date and time when the instruction information was accepted (S15).

The content-related information acquisition unit 302 receives the content-specific information in association with the date and time when the instruction information was accepted, and acquires the content-related information related to the details of the content from the content-related information storage unit 300 (S20). The content-related information acquisition unit 302 supplies the content-related information to the search query generation unit 304. The search query generation unit 304 analyzes the content-related information. Then, the search query generation unit 304 generates, as search queries, the characteristic information of the content specified by the content-specific information (S25). The search query generation unit 304 supplies the generated search query to the related information acquisition unit 306.

The related information acquisition unit 306 accesses the external sites corresponding to the attribute information associated with the search queries to search for and acquire the related information related to the content by using the search queries (S30). For example, when the attribute information associated with the search queries is "person name" and the attribute information "person name" is associated with the sites of "dictionary", "talent agency", and the like where the person is introduced, the related information acquisition unit 306 acquires the related information from the sites.

Meanwhile, in an initial state, the information providing system 1 performs the following operations. First, the indexing unit 308 acquires, in advance, the related information related to the content from pre-specified external sites, and holds the acquired related information in association with the external site-specific information for specifying the external sites where the related information exists. Then, the indexing unit 308 receives search queries from the search query generation unit 304. The indexing unit 308 uses the search queries to search the external sites specified by the external site-specific information held by the indexing unit 308 using the attribute information associated with the search queries, and acquire the related information. The indexing unit 308 supplies the acquired related information to the related information acquisition unit 306. The related information acquisition unit 306 supplies the related information to the scoring unit 310.

The scoring unit 310 calculates the scores of the related information based on the degrees of similarity between the search queries and the related information, associates the calculated scores with the related information, and sorts the related information in accordance with the calculated scores. The scoring unit 310 sorts the related information with higher scores on higher ranks. This allows the interest information listing unit 316 to use the higher-ranked related information on a priority basis in making a list. The scoring unit 310 supplies the sorted related information to the interest area modeling unit 314.

Subsequently, the interest area modeling unit 314 first acquires the history information from the history storage unit 312. The interest area modeling unit 314 then classifies the related information into a plurality of groups interesting the user based on the history information and adds weights to the groups, and adds weights to the external sites as sources of the related information belonging to the plurality of groups to execute modeling of the interest areas (S35). The interest area modeling unit 314 supplies the processing result to the interest information listing unit 316.

The interest information listing unit 316 lists the related information, putting higher priorities on the related information belonging to the groups more interesting to the user, in accordance with the weights associated with the plurality of groups (S40). Then, the interest information listing unit 316 generates listing information including the listed related information. The interest information listing unit 316 supplies the generated listing information to the supply unit 318. The supply unit 318 supplies the listing information to the information providing unit 10 (S45). The information providing unit 10 outputs the listing information to the user in a perceivable manner.

(Advantageous Effects of the Embodiment)

The information providing system 1 according to the embodiment can acquire information related to the content interesting to the user as related information from various external sites, and perform modeling of the user interest area from the acquired related information by using the user's history and other users' histories. Accordingly, the information providing system 1 can automatically determine the genres the user is interested in and the sources on which the user places importance. Therefore, the information providing system 1 can determine precisely the interests of the user at the time of viewing the content, and timely provide the user with the related information interesting to the user in the order of priority.

The information providing system 1 according to the embodiment can acquire part of the content (for example, the images and sounds of the content) upon acceptance of an instruction, from the user, to provide information, and insert the acquired part of the content in the listing information to be provided to the user. Therefore, according to the information providing system 1, the user can refer to the listing information to review readily by themselves the scenes in which they took interest in the content.

In the information providing system 1 according to the embodiment, the indexing unit 308 acquires the related information on the content scheduled for provision (for example, the program scheduled for broadcast) from pre-specified external sites and holds the same. Then, the scoring unit 310 calculates the scores of the related information and sorts the related information in accordance with the scores. Therefore, according to the information providing system 1, even in the initial state of the system, that is, even when the user interest area has not been modeled in the absence of the user history information, it is possible to provide the user with the related information likely to be interesting to the user.

Figure 5:
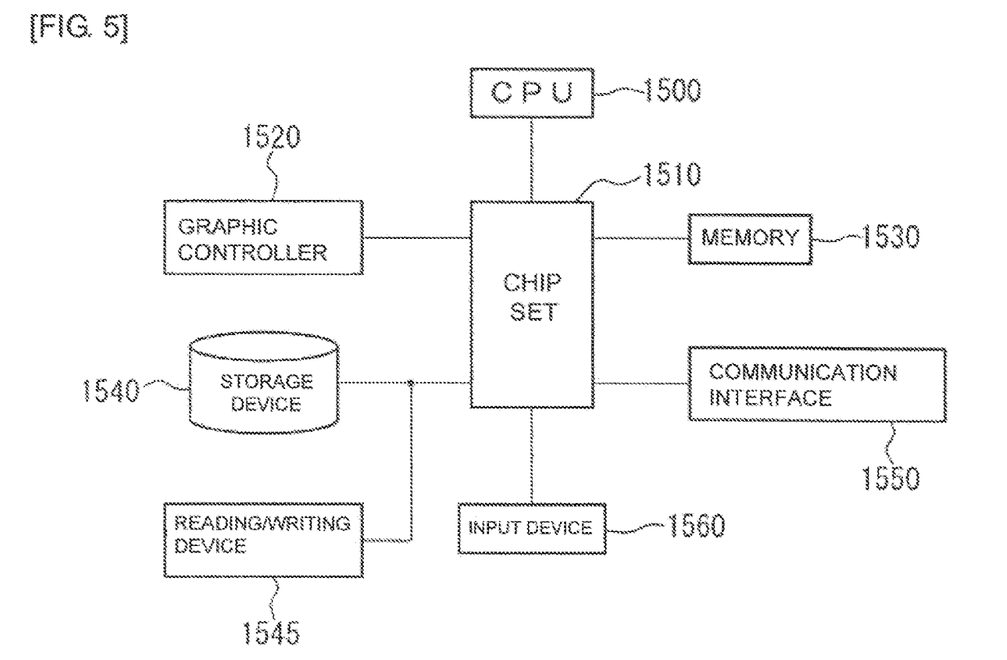
FIG. 5 is a hardware configuration diagram of the information providing system according to the embodiment.

FIG. 5 illustrates an example of a hardware configuration of the information providing system according to the embodiment of the present invention.

The information providing system 1 according to the embodiment of the present invention includes a CPU 1500, a graphic controller 1520, a random access memory (RAM), a read-only memory (ROM) and/or a memory 1530 such as a flash ROM, a storage device 1540 storing data, a reading/writing device 1545 reading data from recording media and/or writing data into recording media, an input device 1560 inputting data, a communication interface 1550 that transmits and receives data to and from external communication devices, and a chip set 1510 that connects the CPU 1500, the graphic controller 1520, the memory 1530, the storage device 1540, and the reading/writing device 1545, the input device 1560, and the communication interface 1550 in a communicable manner. The CPU 1500 or the like is one or more CPUs and may include a plurality of CPUs.

The chip set 1510 connects together the memory 1530, the CPU 1500 accessing the memory 1530 to execute predetermined processing, and the graphic controller 1520 controlling display of external display devices to allows data exchange among these components. The CPU 1500 operates under programs stored in the memory 1530 to control the components. The graphic controller 1520 causes a predetermined display device to display images based on the image data temporarily accumulated in a buffer in the memory 1530.

The chip set 1510 also connects the storage device 1540, the reading/writing device 1545, and the communication interface 1550. The storage device 1540 stores the programs and data used by the CPU 1500 in the information providing system. The storage device 1540 is, for example, a flash memory. The reading/writing device 1545 reads the program and/or the data from the storage media storing the program and/or the data, and stores the read programs and/or data in the storage device 1540. The reading/writing device 1545 acquires predetermined programs from servers on the internet, for example, via the communication interface 1550, and stores the acquired programs in the storage device 1540.

The communication interface 1550 transmits and receives data to and from external devices via a communication network. Even when the communication network is interrupted, the communication interface 1550 can transmit and receive data to and from external devices without intervention of the communication network. The input device 1560, such as a tablet or a microphone, is connected to the chip set 1510 via a predetermined interface.

The programs for information providing system stored in the storage device 1540 are provided to the storage device 1540 via a communication network such as the internet or recording media such as magnetic recording media or optical recording media. Then, the CPU 1500 executes the programs for information providing system stored in the storage device 1540. The programs for information providing system can be installed in a computer by the use of recording media. The recording media storing the programs may be non-transitory recording media such as CD-ROMs or DVDs.

The programs for information providing system executed by the information providing system 1 act on the CPU 1500 to cause the information providing system 1 to serve as the output unit 100, the instruction acceptance unit 200, the content-specific information acquisition unit 205, the content-specific information transmission unit 210, the content-related information storage unit 300, the content-related information acquisition unit 302, the search query generation unit 304, the related information acquisition unit 306, the indexing unit 308, the scoring unit 310, the history storage unit 312, the interest area modeling unit 314, the interest information listing unit 316, the supply unit 318, the advertisement processing unit 320, and the specific processing unit 322 described above with reference to FIGS. 1 to 4.

The embodiment of the present invention has been described so far. However, the foregoing embodiment is not intended to limit the invention according to the claims. In addition, it is to be noted that all of the combinations of features described above in relation to the embodiment are essential to a means for resolving the issues addressed by the invention. Further, the technical elements of the foregoing embodiment may be used singly or divided into a plurality of portions such as program portion and hardware portion.

REFERENCE SIGNS LIST

1 Information providing system
3 Router
5 Communication network
10 Information providing unit
12 Television
14 Video recorder
16 Personal computer
20 Instruction input unit
22 Remote controller
24 Mobile information terminal
30 Information providing server
40 External server
42 External site
50 Advertisement server
100 Output unit
200 Instruction acceptance unit 202 Button
205 Content-specific information acquisition unit
210 Content-specific information transmission unit
300 Content-related information storage unit
302 Content-related information acquisition unit
304 Search query generation unit
306 Related information acquisition unit
308 Indexing unit
310 Scoring unit
312 History storage unit
314 Interest area modeling unit
316 Interest information listing unit
318 Supply unit
320 Advertisement processing unit
322 Specific processing unit
400 Listing information
402 Date and time field
404 Program title field
406 Thumbnail field
408 Recording field
410 Related/interest information field
412 Memo field
414 Advertisement field
416, 418 Advertisement
1500 CPU
1510 Chip set
1520 Graphic controller
1530 Memory
1540 Storage device
1545 Reading/writing device
1550 Communication interface
1560 Input device

The invention claimed is:

1. An information providing system, the system having interconnected units including at least one computer, the system providing a user with information related to content, the system comprising:
an instruction acceptance unit that accepts instruction information, from the user who is viewing content, for instructing to acquire the information at a part of the content interesting to the user, in association with the time when the instruction was issued;
a content-related information acquisition unit that acquires content-related information related to details of the content in accordance with the instruction information;
a search query generation unit that analyzes the content-related information, generates, as search queries, characteristic information which is characteristic of the content; and associates the generated search queries with attribute information of the characteristic information;
a related information acquisition unit that accesses external sites corresponding to the attribute information to acquire related information related to the content when the instruction was issued, by using the search queries;
an interest area modeling unit that classifies the related information acquired by the related information acquisition unit into a plurality of groups interesting to the user and assigns weights to the groups;
an interest information listing unit that lists the related information acquired by the related information acquisition unit in order of the weights associated with the plurality of groups; and
a supply unit that supplies listing information including the listed related information to the user.

2. The information providing system according to claim 1, further comprising a content-specific information acquisition unit that acquires content-specific information for specifying the content viewed by the user, wherein
the supply unit includes at least part of the content-specific information in the listing information.

3. The information providing system according to claim 1, further comprising a history storage unit that stores the past listing information supplied to the user as history information, wherein
the interest area modeling unit classifies the related information acquired by the related information acquisition unit into a plurality of groups and assigns weights to the groups based on the history information.

4. The information providing system according to claim 3, wherein the history storage unit stores the history information of users different from the user.

5. The information providing system according to claim 1, further comprising an indexing unit that acquires the related information from pre-specified external sites and holds the acquired related information in association with external site-specific information for specifying the external sites where the related information exists, wherein
in an initial state, the related information acquisition unit acquires the related information searched for by the search queries with the related information held by the indexing unit.

6. The information providing system according to claim 1, further comprising a scoring unit that calculates scores of the related information acquired by the related information acquisition unit and sorts the related information in accordance with the calculated scores, wherein
the interest information listing unit lists the related information in the order of the sorting.

7. The information providing system according to claim 6, wherein the scoring unit performs the sorting in ascending order of the date and time when the scores were calculated.

8. An information providing server providing a user with information related to content, comprising:
a content-related information acquisition unit that, in accordance with instruction information instructed by the user, who is viewing content, for instructing to acquire the information at a part of the content interesting to the user, acquires content-related information related to details of the content;
a search query generation unit that analyzes the content-related information, generates, as search queries, characteristic information which is characteristic of the content, and associates the generated search queries with attribute information of the characteristic information;
a related information acquisition unit that accesses external sites corresponding to the attribute information to acquire related information related to the content when the instruction was issued, by using the search queries;
an interest area modeling unit that classifies the related information acquired by the related information acquisition unit into a plurality of groups interesting to the user and assigns weights to the groups;
an interest information listing unit that lists the related information acquired by the related information acquisition unit in order of the weights associated with the plurality of groups; and
a supply unit that supplies listing information including the listed related information to the user.

9. An information providing method in an information providing system providing a user with info ion related to content, comprising:
- an instruction acceptance step of accepting instruction information, from the user who is viewing content, for instructing to acquire information at a part of the content interesting to the user, in association with the time when the instruction was issued;
- a content-related information acquisition step of acquiring content-related information related to details of the content in accordance with the instruction information;
- a search query generation step of analyzing the content-related information, generating, as search queries, characteristic information which is characteristic of the content, and associating the generated search queries with attribute information of the characteristic information;
- a related information acquisition step of accessing external sites corresponding to the attribute information to acquire related information related to the content when the instruction was issued, by using the search queries;
- an interest area modeling step of classifying the elated information acquired in the related information acquisition step into a plurality of groups interesting to the user and assigning weights to the groups;
- an interest information listing step of listing the related information acquired in the related information acquisition step in order of the weights associated with the plurality of groups; and
- a supply step of supplying listing information including the listed related information to the user.

10. A program for an information providing system providing a user with information related to content, the program causing the information providing system to implement:
- an instruction acceptance function of accepting instruction information, from the user who is viewing content, for instructing to acquire the information at a part of the content interesting to the user, in association with the time when the instruction was issued;
- a content-related information acquisition function of acquiring content-related information related to details of the content in accordance with the instruction information;
- a search query generation function of analyzing the content-related information, generating, as search queries, characteristic information which is characteristic of the content, and associating the generated search queries with attribute information of the characteristic information;
- a related information acquisition function of accessing external sites corresponding to the attribute information to acquire related information related to the content when the instruction was issued, by using the search queries;
- an interest area modeling function of classifying the related information acquired by the related information acquisition function into a plurality of groups interesting to the user and assigning weights to the groups;
- an interest information listing function of listing the related information acquired by the related information acquisition function in order of the weights associated with the plurality of groups; and
- a supply function of supplying listing information including the listed related information to the user.

11. The program according to claim 10, further comprising a content-specific information acquisition function of acquiring content-specific information for specifying the content viewed by the user, wherein
the supply function includes supplying at least part of the content-specific information in the listing information.

12. The program according to claim 10, further comprising a history storage function of storing the past listing information supplied to the user as history information, wherein
the interest area modeling function classifies the related information acquired by the related information acquisition function into a plurality of groups and assigns weights to the groups based on the history information.

13. The program according to claim 12, wherein the history storage function stores the history information of users different from the user.

14. The program according to claim 10, further comprising an indexing function of acquiring the related information from pre-specified externalsites and holds the acquired related information in association with external site-specific information for specifying the external sites where the related information exists, wherein
in an initial state, the related information acquisition function acquires the related information searched for by the search queries with the related information held by the indexing unit.

15. The program according to claim 10, further comprising a scoring function of calculating scores of the related information acquired by the related information acquisition function and sorts the related information in accordance with the calculated scores, wherein
the interest information listing function lists the related information in the order of the sorting.

16. The program according to claim 15, wherein the scoring function performs the sorting in ascending order of the date and time when the scores were calculated.

* * * * *